UNITED STATES PATENT OFFICE 2,325,115

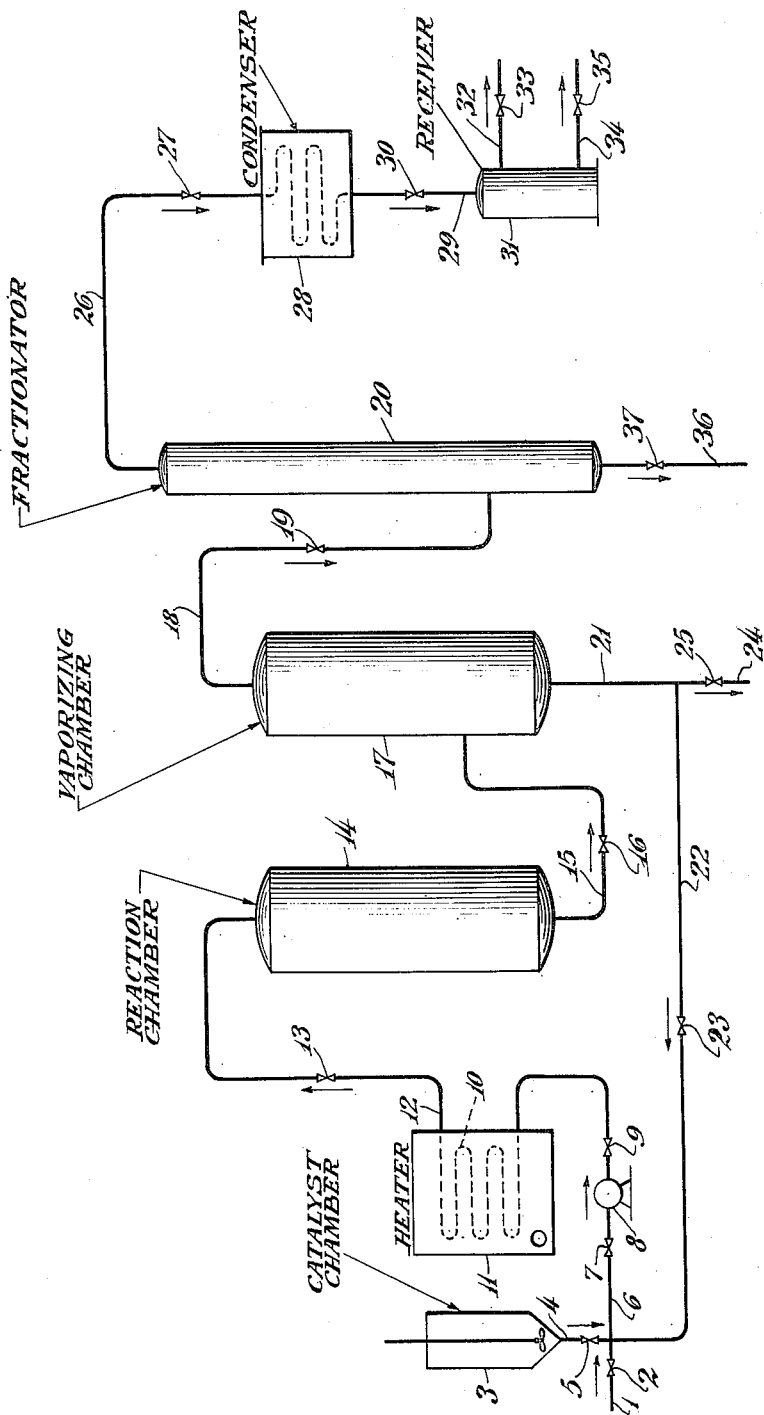

DESULPHURIZING HYDROCARBON DISTILLATE

Gustav Egloff, Chicago, Ill., assignor to Universal Oil Products Company, Chicago, Ill., a corporation of Delaware Application April 25, 1940, Serial No. 331,571

6 Claims. (Cl. 196—30)

This invention relates to a process for improving the properties of hydrocarbon distillate. More particularly it relates to the desulphurization of hydrocarbon distillates boiling within the gasoline range, and the distillates to which the invention has the widest application are straight run, cracked and natural gasolines. Other types of distillate may also be treated, as for example, higher boiling fractions in the naphtha range and fractions of hydrocarbon oils useful as the so-called safety fuel for aviation purposes or for tractor fuel of high antiknock quality, wherein the presence of sulphur is objectionable.

In one specific embodiment the present invention is a process for treating hydrocarbon distillate to desulphurize and otherwise improve said distillate, which comprises contacting it with a powdered desulphurizing catalyst under conditions of temperature and pressure adequate to effect substantial reduction in the sulphur content thereof and recovering the desulphurized distillate.

The accompanying drawing, which is purely diagrammatic, illustrates one application of the process but should not be interpreted as unduly limiting the scope of the invention.

Referring to the drawing, the hydrocarbon distillate undergoing conversion is introduced through line 1 and valve 2, and is mixed with a powdered catalyst from catalyst charger 3, passing through line 4 and valve 5. As previously indicated, the hydrocarbon distillate may be any sulphur-containing oil, but is usually within the motor fuel boiling range. The catalytic agent employed is normally of a high degree of subdivision with particle sizes approaching colloidal dimensions. The invention is not necessarily limited to the use of catalyst of such extreme subdivision, but this is to be preferred because of the high degree of surface presented, as well as the fact that the catalyst is more readily carried in suspension in the oil without settling in the various parts of the equipment. Numerous catalysts may be employed but they are preferably of the type containing alumina as an active ingredient. For example, the mineral bauxite either with or without calcination, activated alumina, or other types of alumina which have been formed by the precipitation of aluminum hydrate from an aluminum salt followed by heating at a temperature of approximately 500–1000° F. for relatively short intervals, may be used. Another type of catalyst comprises alumina having deposited thereon oxides of elements appearing in the left-hand column of groups IV, V, and VI of the periodic table. Particularly adapted to the present invention is alumina containing minor quantities of oxides or sulphides of chromium, molybdenum, tungsten, vanadium, etc. The quantity of the added compounds is usually within the limits of approximately 2–30% by weight of the total catalyst composite.

The catalyst may be fed directly into the hydrocarbon oil as a powder, or in the form of a slurry in a portion of the charging stock undergoing treatment. It is usually added in amounts of 0.1–5% by weight of the oil.

The mixture of charging stock and catalyst passes through line 6, valve 7, pump 8 and valve 9 to coil 10 which is disposed in heater 11. The temperature is increased to a point within the range of approximately 500–850° F. and a pressure adequate to maintain a major portion of the oil in the liquid form. Although it is within the scope of the invention to treat the hydrocarbon oil in the vapor phase, it is preferred to carry out the treatment with the oil in the liquid phase or mixed liquid and vapor phase. The pressure is normally within the range of approximately 100–2000 pounds per square inch. The heated mixture passes through line 12 and valve 13 to reaction chamber 14. This may comprise an empty chamber or may contain contacting members whereby the oil and catalyst may be mixed with even greater intimacy. Normally the reactor is maintained under temperature and pressure conditions similar to those used in the heating coil. However, the pressure may be decreased so that a considerable degree of vaporization occurs in the reaction chamber and the treatment takes place largely in the vapor phase. The temperature conditions are maintained within the range of approximately 500–850° F. The mixture of reactants and catalyst passes through line 15 and valve 16 to vaporizing chamber 17 wherein a part or all of the oil is vaporized and passed through line 18 and valve 19 to fractionator 20. A part of the reactants from vaporizing chamber 17 containing catalyst in suspension therein may be removed through line 21, line 22 and valve 23 which joins with the charging stock and passes through line 6 and by previous described routes is returned to the reaction zone. The purpose of this is to build up a comparatively high concentration of catalyst in the reaction zone without the necessity for charging a high percentage of catalyst with the original oil. Normally a small amount of catalyst is charged with the original oil, say of the order of 0.1–5% and the catalyst concentration in the reaction zone is built up to the order of 5-25% by recirculation.

A portion of the partially spent catalyst may be removed through line 24 and valve 25 to a regenerating step not shown. The catalyst is usually regenerated by being contacted with an oxygen-containing gas at a temperature within the range of approximately 850-1500° F. The regenerated catalyst is returned to the system for further use. It is also within the scope of the invention to vaporize and remove the hydrocarbons substantially completely from vaporizing chamber 17. The catalyst withdrawn from the chamber is then in dry form and may be reslurried by means not shown before recycling. The spent catalyst is reactivated directly without necessity for separating oil.

Hydrocarbon distillate of the desired boiling range may be removed from fractionator 20 through line 26, valve 27, condenser 28, line 29, valve 30 to receiver 31. Gaseous products which may be formed in minor amounts are removed through line 32 and valve 33. The gasoline is withdrawn through line 34 and valve 35, and may be subjected to additional treating steps if necessary. For example, the oil contains considerable quantities of hydrogen sulphide which may be removed by well known methods such as scrubbing with aqueous solutions of alkali metal hydroxides or carbonates. If the hydrocarbon distillate undergoing treatment is a cracked gasoline, it may be further stabilized against oxidation and consequent formation of gum and loss in antiknock value by having added thereto small amounts of gum inhibitors such as selected fractions of wood tar distillate, N-substituted alkyl aminophenols, etc. Higher boiling portions of hydrocarbon distillate may be removed from fractionator 20 through line 36 and valve 37.

An advantage of the present process lies in the reduction of the sulphur content of high sulphur gasolines. It has been found, however, that gasolines of comparatively low sulphur content are greatly improved in antiknock qualities, particularly in regard to their susceptibility to octane number increase upon the addition of tetraethyl lead when the sulphur content is reduced or practically eliminated. Thus in certain instances, it may be highly desirable to reduce the sulphur content of motor fuel to a point below 0.005%. This is particularly true with aviation fuel blends wherein the quantity of tetraethyl lead added to the blend is best kept to a comparatively low value, both from the expense and operating standpoints.

The following examples are given to illustrate the usefulness and practicability of the process but should not be construed as limiting it to the exact conditions given therein.

*Example 1.*—A California gasoline having a total sulphur content of 0.51% is treated with bauxite which has been ground to pass a 200 mesh screen. Approximately 1% of catalyst is used. The mixture is treated as indicated in the foregoing specification at a temperature of 700° F. and a pressure of 500 pounds per square inch. Sufficient catalyst is recycled to build up the concentration in the reaction zone to approximately 12% by weight of the gasoline charged. The sulphur content of the treated gasoline may be reduced to 0.02%. The octane number of material charged is 72 and is increased to 73.5 by the treatment. The octane number of the original gasoline containing 3 cc. of tetraethyl lead per gallon may be 77, while that of the treated gasoline with the same quantity of lead is 82.

*Example 2.*—A straight run gasoline containing 0.16% sulphur is treated at a temperature of 725° F., a pressure of 650 pounds per square inch using an alumina catalyst having deposited thereon approximately 8% by weight of chromic oxide, the resulting gasoline having a sulphur content of 0.002%. The original gasoline has an antiknock value of 76 which is increased with 3 cc. of tetraethyl lead to 89. Upon treatment as described, the octane number is increased to 78 and upon addition of tetraethyl lead to 92.

*Example 3.*—A fraction of catalytically cracked naphtha useful as a component of aviation safety fuel may have a boiling range of approximately 250-450° F. and an octane number of 81. Upon addition of 3 cc. of tetraethyl lead, the octane number is increased to 86. The sulphur content may be reduced to 0.02%. After treatment in the manner described, the octane number is 82, which is increased to 91 upon the addition of 3 cc. of lead. The sulphur content is reduced to less than 0.001%.

I claim as my invention:

1. A process for refining sulphurous hydrocarbon oils which comprises continuously passing a stream of the oil through a heating zone, adding to the oil stream being supplied to the heating zone approximately 0.1-5% of fresh finely divided desulphurizing catalyst, subjecting the stream to desulphurizing conditions of temperature and pressure in the heating zone, subsequently separating the heated material into vapors and a residue containing partially spent desulphurizing catalyst, and recirculating to the heating zone a sufficient quantity of said residue to maintain in the oil stream passing through said zone a catalyst concentration of the order of 5-25%.

2. The process as defined in claim 1 further characterized in that said catalyst comprises alumina.

3. The process as defined in claim 1 further characterized in that said catalyst comprises alumina supporting a relatively small amount of chromia.

4. The process as defined in claim 1 further characterized in that said catalyst comprises a compound of a metal from the left-hand column of group IV of the periodic table.

5. The process as defined in claim 1 further characterized in that said catalyst comprises a compound of a metal from the left-hand column of group V of the periodic table.

6. The process as defined in claim 1 further characterized in that said catalyst comprises a compound of a metal from the left-hand column of group VI of the periodic table.

GUSTAV EGLOFF.